W. J. O'NEAL.
PUNCH.
APPLICATION FILED FEB. 3, 1913.
1,082,209.
Patented Dec. 23, 1913.
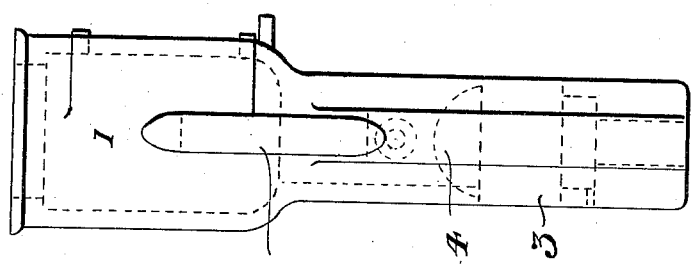
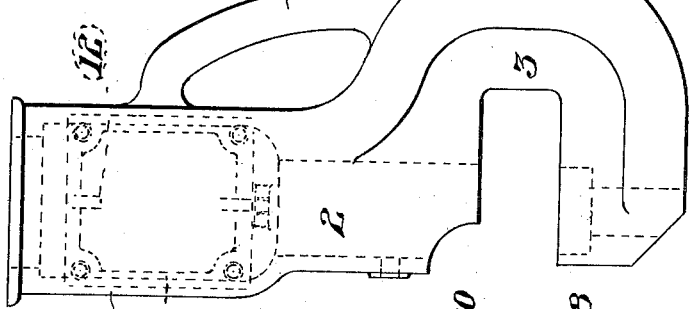
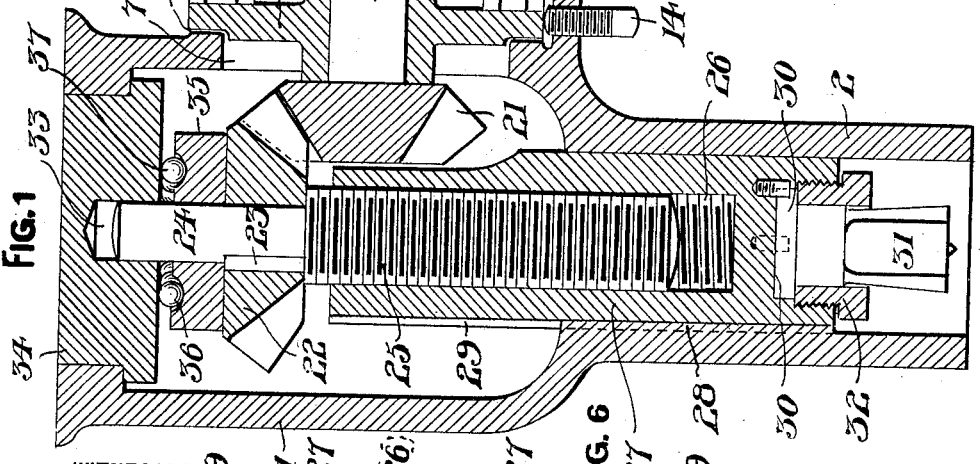
WITNESSES
INVENTOR
William J. O'Neal
By Henry C. Evert
ATTORNEYS

UNITED STATES PATENT OFFICE.

WILLIAM J. O'NEAL, OF NORTH BRADDOCK, PENNSYLVANIA, ASSIGNOR OF ONE-THIRD TO VAN K. CROZIER, OF BRADDOCK, PENNSYLVANIA, AND ONE-THIRD TO RUDOLPH L. O'NEAL, OF HOMESTEAD, PENNSYLVANIA.

PUNCH.

1,082,209. Specification of Letters Patent. Patented Dec. 23, 1913.

Application filed February 3, 1913. Serial No. 746,008.

*To all whom it may concern:*

Be it known that I, WILLIAM J. O'NEAL, a citizen of the United States of America, residing at North Braddock, in the county of Allegheny and State of Pennsylvania, have invented certain new and useful Improvements in Punches, of which the following is a specification, reference being had therein to the accompanying drawing.

This invention relates to punches, and the primary object of my invention is to provide a screw punch that is operated through the medium of gears and a ratchet mechanism, whereby the screw of said punch can be expeditiously adjusted and a piece of work quickly operated upon.

Another object of this invention is to provide a ball bearing screw punch consisting of comparatively few parts that are easily assembled to provide a strong, durable and inexpensive device.

A further object of this invention is to provide a ball bearing screw punch that has interchangeable punches and dies that are arranged whereby they can be renewed or others substituted therefor according to the piece of work to be operated upon.

With the above and other objects in view the invention resides in the novel construction, combination and arrangement of parts to be hereinafter specifically described and then claimed.

Reference will now be had to the drawing, wherein:—

Figure 1 is a vertical sectional view of a portion of a ball bearing screw punch in accordance with this invention, Fig. 2 is a side elevation of the frame of the punch, Fig. 3 is a front elevation of the same, Fig. 4 is a plan of the frame, Fig. 5 is a view illustrating details of a detachable bearing plate, and Fig. 6 illustrates views of a screw sleeve or plunger.

A punch in accordance with this invention comprises a frame having a cylindrical housing 1 terminating in a throat 2 and a goose neck 3. The goose neck 3 is reinforced by a web 4 connected to the housing 1 by a web 5 that serves as a handle whereby the punch can be easily carried. One side of the housing 1 is provided with a rectangular enlargement 6 having a rectangular opening 7. The opening 7 is closed by a bearing plate 8 having a central cylindrical bearing 9. The bearing plate 8 is slotted, as at 10 and connected to the enlargement 6 by screw bolts 11 or other fastening means. The bearing plate 8 has oppositely disposed grooves or recesses 12 to receive ribs 13, carried by the enlargement 6, and these ribs guide the bearing plate 8 when said bearing plate is adjusted through the medium of a set screw 14, carried by an extension 15 of the housing 1. By loosening the screw bolts 11 and adjusting the set screw 14 the bearing plate 8 can be shifted to a desired position and then locked by tightening the screw bolts 11.

Journaled in the bearing 9 of the plate 8 is an operating shaft 16 and movably mounted upon the outer end of said shaft is the bifurcated end 17 of a handle socket 18. The bifurcated end of the handle socket 18 provides clearance for a ratchet wheel 19 mounted upon the outer end of the shaft 16, and engaging said ratchet wheel is a spring pressed pawl 20 that rotates the ratchet wheel 19 as the handle socket 18 is oscillated or swung about the shaft 16. The elements 17 to 20 inclusive constitute a well known means of manual manipulation for imparting a rotary movement to the shaft 16.

The inner end of the shaft 16 has a beveled gear wheel 21 meshing with a similar gear wheel 22, keyed or otherwise mounted, as at 23 upon the stem 24 of a screw 25. The screw 25 is adjustably mounted in the threaded socket 26 of a sleeve or plunger 27 slidably mounted in the throat 2 of the housing 1. The inner wall of the throat 2 has a rib 28 engaging in a longitudinal groove 29 provided therefor in the sleeve or plunger 27, said rib preventing the sleeve or plunger from rotating relatively to the screw 25 and the throat 2.

The outer end of the sleeve or plunger 27 has a seat 30 for a non-rotatable punch 31, which has the head thereof retained in engagement with the seat 30 by a nut 32. The punch 31 is adapted to coöperate with a suitable die supported by the goose neck 3 in operating upon a piece of work.

The stem 24 of the screw 25 extends into a socket 33 provided therefor in a thrust bearing 34 fitted in the end of the housing 1. Coöperating with the thrust bearing 34 is another bearing 35 that encircles the stem 24 and has a ball race 36 for anti-frictional balls 37 that insure a non-frictional rotation of the screw relatively to the thrust bearing 34.

It is apparent that when the shaft 16 is revolved through the medium of the ratchet mechanism or other manually operated means that a rotary movement is imparted to the screw 25, which serves for shifting or feeding the sleeve or plunger 27 longitudinally of the throat 2. It is through the medium of this screw and the mechanism employed for rotating the same that considerable power can be applied for operating upon a piece of work.

I attach considerable importance to the simplicity of construction, particularly to the manner in which the parts are assembled, and especially the adjustable bearing plate 8 which permits of the gear wheels 21 and 22 being properly meshed or located.

While in the drawing there is illustrated a preferred embodiment of the invention, it is to be understood that the structural elements are susceptible to such variations and modifications as fall within the scope of the appended claims.

What I claim is:—

1. A punch of the type described comprising a housing having a throat and a goose neck, an adjustable bearing plate supported by one side of said housing, a revoluble shaft journaled in said bearing plate, a plunger movable longitudinally of the throat of said housing and provided with a screw socket, a punch carried by said plunger, a revoluble screw extending into the screw socket of said plunger for adjusting said plunger longitudinally of the throat of said housing, and means located within said housing and operated through the medium of said shaft for imparting a rotary movement to said screw.

2. A punch of the type described comprising a housing having a throat, an adjustable bearing plate carried by said housing, a shaft journaled in said bearing plate, a plunger movable longitudinally of the throat of said housing and adapted to support a punch, a screw extending into said plunger whereby said plunger can be adjusted longitudinally of the throat of said housing, thrust bearings in connection with one end of said screw, beveled gears actuated by said shaft for imparting movement to said screw, and anti-frictional balls in connection with said thrust bearings.

3. A punch of the type described comprising a housing having a throat, an adjustable bearing plate carried by said housing, a shaft journaled in said bearing plate, a plunger movable longitudinally of the throat of said housing and adapted to support a punch, a screw extending into said plunger whereby said plunger can be adjusted longitudinally of the throat of said housing, thrust bearings in connection with one end of said screw, beveled gears actuated by said shaft for imparting movement to said screw, anti-frictional balls in connection with said thrust bearings, and means including a ratchet mechanism in connection with said shaft to facilitate manually rotating the same.

In testimony whereof I affix my signature in the presence of two witnesses.

WILLIAM J. O'NEAL.

Witnesses:
J. P. APPLEMAN,
KATHERINE ERRETT.